United States Patent [19]

Lo Presti et al.

[11] Patent Number: 5,209,434
[45] Date of Patent: May 11, 1993

[54] AERODYNAMIC FAIRING FOR REDUCING DRAG OF STRUCTURAL OPENINGS

[75] Inventors: Leroy P. Lo Presti; James R. Lo Presti; Curt Lo Presti, all of Vero Beach, Fla.

[73] Assignee: Roy Lo Presti, Vero Beach, Fla.

[21] Appl. No.: 757,323

[22] Filed: Sep. 10, 1991

[51] Int. Cl.$^5$ .............................................. B64C 7/00
[52] U.S. Cl. .................................................... 244/130
[58] Field of Search ................. 244/1 R, 118 S, 129.1, 244/130, 53 R; 114/183–185; 459/164

[56] References Cited

U.S. PATENT DOCUMENTS

| | | | |
|---|---|---|---|
| 2,565,555 | 8/1951 | Goldberg | 454/164 |
| 2,853,932 | 9/1958 | Freydl | 454/164 |
| 3,934,846 | 1/1976 | Maurer | 244/130 |
| 5,018,683 | 5/1991 | Hahn et al. | 244/1 R |

FOREIGN PATENT DOCUMENTS 786548  9/1935  France ................... 14/185

*Primary Examiner*—Galen Barefoot

[57] ABSTRACT

The named fairing reduces the aerodynamic drag of structural openings, increases the flow rate of a vent in a moving body, reduces the accumulation of toxic fumes in a cavity on a moving body and reduces the noise generated by a cavity on a moving body.

Reducing the drag of structural openings such as cowling exits, landing gear wells, control surface gaps and vents by placing fairings downstream and external to basic contour has not yet been done or marketed commercially.

There have been many devices marketed that are located at the forward side of the openings. These devices protrude outside contour to deflect airflow over the opening. In doing so these devices produce low pressure which acts on the aft side of the device; the force developed because of this pressure points in the downstream direction, causing a drag penalty.

None of the known devices reduce pressure without causing large amounts of drag. The above mentioned fairing produces low pressure but its resultant force points perpendicular to stream flow and hence produces very little adverse pressure drag. In this approach, the above mentioned fairing is unique.

1 Claim, 2 Drawing Sheets

Figure 3
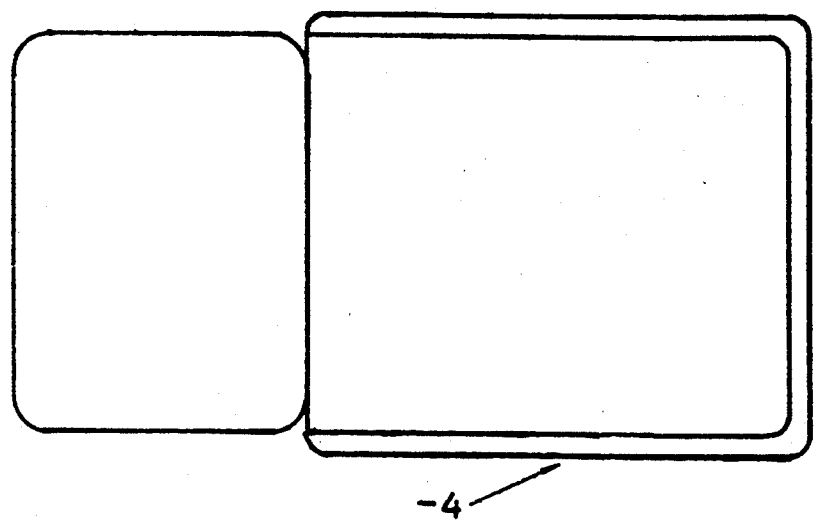
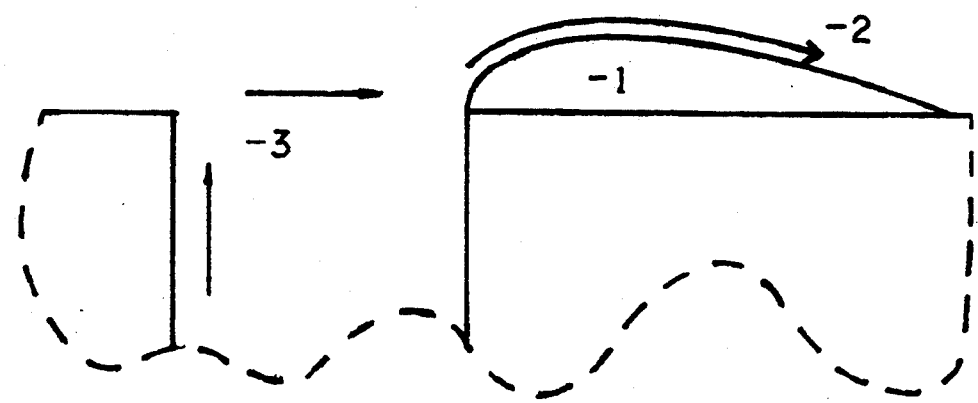
Figure 1
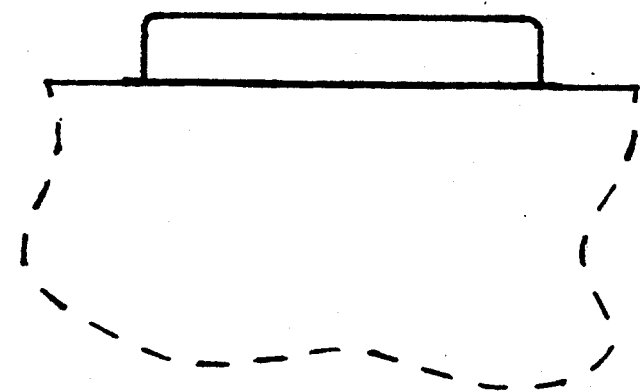
Figure 2

Figure 6
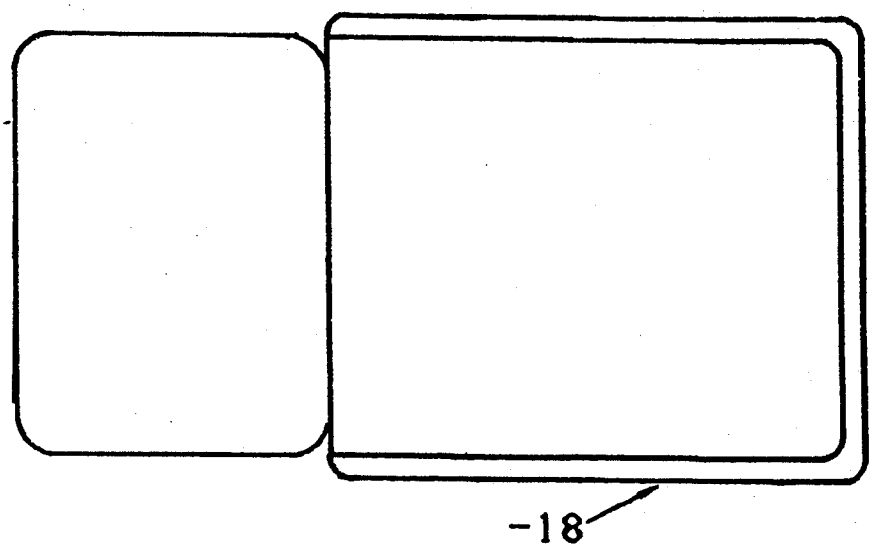
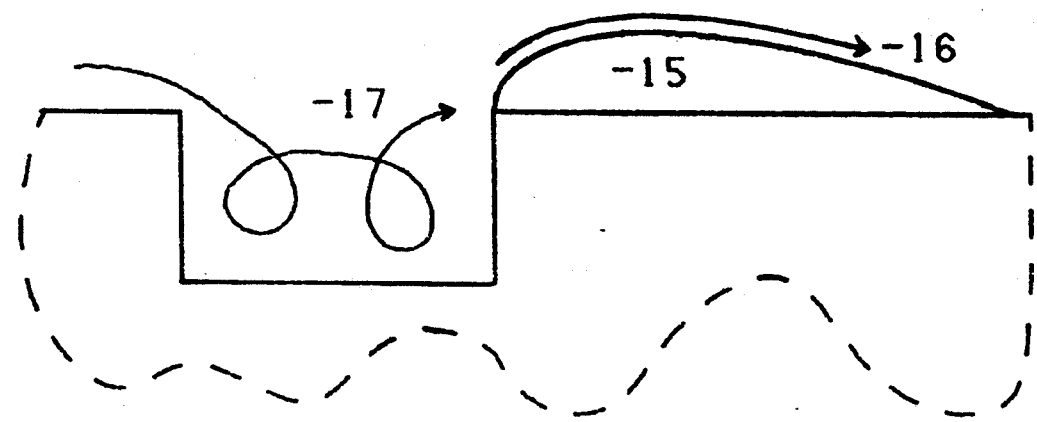
Figure 4
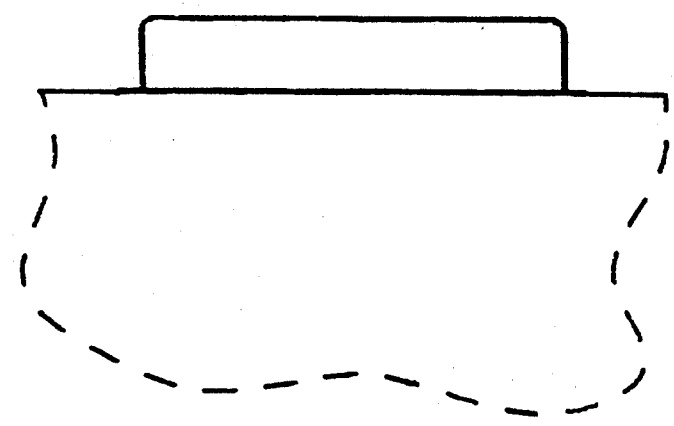
Figure 5

AERODYNAMIC FAIRING FOR REDUCING DRAG OF STRUCTURAL OPENINGS

BRIEF SUMMARY

Most aircraft have various structural openings exposed to the airflow. Some of the openings are passive, some are active. Examples of active openings are engine exhaust, air conditioner discharge, engine cooling air exits and air discharge vents. The above mentioned fairing augments the flow of active openings by producing an area of low pressure adjacent to and immediately aft of the opening.

Examples of passive openings are landing gear wheel wells, gaps between control surfaces and main wing structure. Most of these cavities do not prevent airflow from entering the opening nor do they allow entrapped air to smoothly exit. Disrupted exit flow caused by structural openings produce drag which reduces airspeed. The above titled fairing does not in any way prevent airflow from entering structural openings, but it does help the flow exit smoothly, gain back some of its lost velocity and in doing so, reduces the drag of the opening.

The main point of these fairings is they are positioned immediately downstream of the openings, they are external to the basic contours of the aircraft and they do not interfere with the mechanical functioning of the opening in any way.

BRIEF DESCRIPTION OF DRAWING VIEWS

The enclosed drawings show typical fairings for both active and passive cases.

FIG. 1 on sheet 1 and FIG. 4 on sheet 2 show a side view of the fairing.

FIG. 2 on sheet 1 and FIG. 5 on sheet 2 is an end view looking in the direction of the flow.

FIG. 3 on sheet 1 and FIG. 6 on sheet 2 is a top view of the fairings.

DETAILED DESCRIPTION

The aerodynamic fairing reduces the drag of structural openings by assisting the airflow to exit smoothly. The air which enters the cavity loses some of its velocity. The exiting flow is forced to follow the fairing contour which smoothly accelerates the air to regain some of its lost velocity which reduces the drag caused by the opening.

This fairing will function even better for an opening that is an exit for internal flows by providing low pressure generated over the fairing's forward surface. Low pressure generated by the fairing's shape will add a pumping force to increase exit flow rate while at the same time reduces the drag found in conventional exits.

The fairing is positioned downstream of the opening, is external to the basic contour and does not interfere with the mechanical functioning of the opening in anyway.

Since the fairing can exists in a hot environment, it should be constructed from high temperature, fireproof polyester resin and fiberglass cloth. A fiberglass part can be hand layed up in a female fiberglass mold. This method requires a narrow flange that follows contour around all sides of the fairing so that fasteners may be used to install the device in place.

The general shape of the fairing in the direction of flow is a rounded lip (left edge in FIG. 1) followed by an airfoil shape to allow the air to accelerate followed by a gradual taper to a sharp trailing edge which lets the air exit smoothly.

The most favorable lip geometry is a leading edge radius of 10% of the fairing length followed by a tapered body which approximates an airfoil shape to give a thickness-to-length ratio of 15%. Fairing width is dictated by the size of the opening.

We claim:

1. In an aircraft having an external skin and a structural opening in said skin, the improvement comprising: a fairing means for reducing the aerodynamic drag associated with said structural opening, said fairing means being located on said external skin immediately downstream of said structural opening and protruding outwardly from said external skin into the airflow past said external skin, said fairing means has a rounded lip adjacent said structural opening followed by an airfoil shape to allow the airflow to accelerate followed by a gradual taper to a sharp trailing edge downstream of said structural opening which lets the airflow exit smoothly; and the external skin upstream of said structural opening remains unaltered.

* * * * *